(12) United States Patent
Desoutter

(10) Patent No.: US 10,870,504 B2
(45) Date of Patent: Dec. 22, 2020

(54) METHOD FOR FORMING AND FILLING A CONTAINER WITH AN END PRODUCT COMPRISING A CONCENTRATED LIQUID

(71) Applicant: DISCMA AG, Hunenberg (CH)

(72) Inventor: Luc Desoutter, Octeville sur Mer (FR)

( * ) Notice: Subject to any disclaimer, the term of this patent is extended or adjusted under 35 U.S.C. 154(b) by 525 days.

(21) Appl. No.: 15/321,157

(22) PCT Filed: Jun. 26, 2015

(86) PCT No.: PCT/EP2015/064585
§ 371 (c)(1),
(2) Date: Dec. 21, 2016

(87) PCT Pub. No.: WO2015/197846
PCT Pub. Date: Dec. 30, 2015

(65) Prior Publication Data
US 2017/0158361 A1  Jun. 8, 2017

(30) Foreign Application Priority Data
Jun. 27, 2014 (EP) ..................................... 14306032

(51) Int. Cl.
*B65B 3/02* (2006.01)
*B29C 49/36* (2006.01)
(Continued)

(52) U.S. Cl.
CPC .............. *B65B 3/022* (2013.01); *B29C 49/36* (2013.01); *B29C 49/4273* (2013.01);
(Continued)

(58) Field of Classification Search
CPC .. B65B 3/022; B65B 3/24; B65B 3/26; B67C 3/023; B67C 3/14; B67C 3/20;
(Continued)

(56) References Cited

U.S. PATENT DOCUMENTS 3,813,847 A * 6/1974 Kuhnle ..................... B65B 3/24
53/167
4,487,237 A * 12/1984 Sick .......................... B65B 3/24
141/198

(Continued)

FOREIGN PATENT DOCUMENTS

EP          1283795 B1      12/2004
WO       2013094587 A1      6/2013
WO    WO-2013094587 A1 *    6/2013  ............... A23L 2/00

OTHER PUBLICATIONS

Translation of WO-2013094587-A1, 2019.*

*Primary Examiner* — Anna K Kinsaul
*Assistant Examiner* — Veronica Martin
(74) *Attorney, Agent, or Firm* — Eric J. Sosenko; Jonathan P. O'Brien; Honigman LLP (57) ABSTRACT

A method of forming and filling a container. The method includes the steps of placing a preform in fluidic communication with an outlet of an injection device of a forming station and forming a container by expanding the preform during a forming step, wherein a forming liquid is injected into the preform through the outlet to expand the preform into the container. The forming liquid is a cleanable liquid. The method further includes a step of transferring the formed container to a concentrate filling station, separate from the forming station and a step of filling the concentrated liquid in the container already containing the cleanable liquid. The step of filling the concentrated liquid is performed in the concentrate filling station.

17 Claims, 3 Drawing Sheets

(51) Int. Cl.
*B29C 49/42* (2006.01)
*B29C 49/46* (2006.01)
*B65B 3/24* (2006.01)
*B29C 49/12* (2006.01)
*B29C 49/58* (2006.01)
*B29C 49/06* (2006.01)
*B67C 3/02* (2006.01)
*B67C 3/22* (2006.01)
*B67C 3/24* (2006.01)
*B29K 101/12* (2006.01)
*B29K 105/00* (2006.01)
*B29L 31/00* (2006.01)

(52) U.S. Cl.
CPC .............. *B29C 49/46* (2013.01); *B65B 3/24* (2013.01); *B67C 3/023* (2013.01); *B67C 3/225* (2013.01); *B67C 3/242* (2013.01); *B29C 49/06* (2013.01); *B29C 49/12* (2013.01); *B29C 49/4289* (2013.01); *B29C 2049/4664* (2013.01); *B29C 2049/5803* (2013.01); *B29K 2101/12* (2013.01); *B29K 2105/258* (2013.01); *B29L 2031/7158* (2013.01); *B67C 2003/227* (2013.01); *B67C 2003/228* (2013.01)

(58) Field of Classification Search
CPC ... B67C 3/208; B67C 7/004; B67C 2003/227; B67C 2007/005; B29C 49/46
USPC ...... 53/428, 452, 471, 559, 561, 266.1, 267, 53/282; 141/144; 264/524
See application file for complete search history.

(56) References Cited

U.S. PATENT DOCUMENTS

| | | | | |
|---|---|---|---|---|
| 4,860,802 | A * | 8/1989 | Yamaguchi | B65B 3/04 141/6 |
| 6,729,361 | B2 * | 5/2004 | Noell | B65B 3/04 141/101 |
| 7,059,104 | B2 * | 6/2006 | Taylor | B65B 3/34 53/130.1 |
| 9,079,345 | B2 * | 7/2015 | Chauvin | B29C 49/46 |
| 9,302,894 | B2 * | 4/2016 | Poeschl | B67C 3/02 |
| 9,394,153 | B2 * | 7/2016 | Goldman | B67C 3/007 |
| 9,428,373 | B2 * | 8/2016 | Tanaka | B67C 3/287 |
| 2003/0150514 | A1 * | 8/2003 | De Villele | B65B 3/24 141/144 |
| 2013/0122136 | A1 * | 5/2013 | Fevre | B29C 49/46 425/535 |
| 2013/0147097 | A1 * | 6/2013 | Lane | B29C 49/0073 264/524 |
| 2013/0220481 | A1 * | 8/2013 | Hartel | B67C 3/045 141/9 |
| 2014/0102045 | A1 * | 4/2014 | Yoshikane | B65B 43/465 53/459 |
| 2014/0174034 | A1 * | 6/2014 | Drenguis | B29C 49/46 53/452 |
| 2016/0052654 | A1 * | 2/2016 | Voth | B65B 3/10 53/426 |
| 2016/0236396 | A1 * | 8/2016 | Chauvin | B29D 22/003 |

* cited by examiner

METHOD FOR FORMING AND FILLING A CONTAINER WITH AN END PRODUCT COMPRISING A CONCENTRATED LIQUID

TECHNICAL FIELD OF THE INVENTION

The present invention relates to a method for forming a container from a preform and filling the container with a liquid.

In particular, the invention relates to a method for forming and filling a container with a liquid to which a concentrated liquid is added.

The invention also relates to a machine implementing such a method.

In the application, "liquid" has a physical meaning. It designates any incompressible and able to flow medium.

BACKGROUND

In the field known as "hydroforming", it is known to use a pressurized liquid injected inside a preform placed in a mold to shape a container according to the shape of the mold and fill the shaped container with the liquid at the same time. Advantageously, the injected liquid is the end product contained in the container, i.e. the product which is intended to be provided to a consumer using the container.

The hydroforming technique has several advantages compared to the conventional air blowing technique, wherein the container is first formed by injecting a compressed gas, for example pressurized air, in the preform. One of these advantages is that the obtained container is simultaneously filled with the end product.

In the hydroforming technique, the filled containers can be produced at a higher rate since the forming step of the container is not separated from the filling step. The energy cost of hydroforming is reduced since there is no need to produce the compressed gas used in air blowing. Higher pressures can easily be imparted to the preform with the forming liquid. Such pressures allow obtaining a container having a very satisfactory shape since the wall of the preform is urged against the wall of the mold in an optimal manner. US-2014/0174034 discloses such a hydroforming technique.

However, in some cases, the end product is not compatible with the hydroforming technique, in particular when the end product is a sugary liquid. Hydroforming a container using a juice or tea as the forming liquid is known. In such a case, if a formed and filled container bursts during the forming and filling step, which can happen with the high pressure of the injected liquid, or if the liquid is spilled out of the container, which can happen for example when the injection nozzle is retrieved from the container, the liquid soils the forming station, and more particularly the mold. The forming station has then to be cleaned in order to prevent the contamination of other containers or the development of micro-organisms. Such a cleaning requires the machine to be stopped and a thorough cleaning to be performed. The cleaning is all the more complicated with a hydroforming machine having a complex mechanical structure. Consequently, the production rate of such a machine is greatly reduced in case of bursting of a container or in case of spilling. The use of a sugary liquid or of another liquid, which is not easily cleanable, is therefore not adapted for forming containers with the hydroforming technique.

In other cases, the end product is sometimes obtained by mixing a first liquid with a second liquid. EP-1 283 795 for example discloses a method wherein already formed containers are first filled in part with full-fat milk and then filled with slim milk to complete the filling of the container, thereby allowing easily changing the proportion of fat in the container. According to another example, for a sugary beverage as an end product, a sugary concentrate liquid is mixed with still water or with carbonated water to create a non-carbonated or a carbonated soft drink. Similarly, a concentrated liquid, for example containing an aroma, can be mixed with alcohol or with a detergent liquid to create an aromatic cleaning product for example. During a conventional filling step, wherein the liquid is injected at a low pressure inside an already formed container, the concentrated liquid is placed inside the container and the other liquid is then injected in the container, thereby mixing the two liquids to create the end product. WO-2013/094587 discloses a method for filling a container with a liquid and with a concentrated liquid.

These methods are satisfactory with a conventional filling step because the risks of bursting are reduced and because the filling station are more easily cleanable in case of spilling. Indeed, the filling step does not occur while the container is placed in a mold as in the hydroforming technique.

However, these methods are not satisfactory with the hydroforming technique because the injection at a high pressure of the liquid can cause a bursting of the container containing a liquid which is not easily cleanable, as described previously. In some cases, for example for some compositions of sugary concentrated liquid, the injection of the liquid also causes an important foaming of the liquid, which can lead to a spilling of the liquid outside the container.

One of the aims of the invention is to overcome these drawbacks by proposing a hydroforming method compatible with a not easily cleanable end product.

SUMMARY OF THE INVENTION

To this end, the invention relates a method for forming a container from a preform and filling the container with an end product, the end product being obtained by mixing a cleanable liquid with a concentrated liquid, the method comprising the steps of:

placing the preform in a forming station comprising an injection device such that the preform is placed in fluidic communication with an outlet of the injection device, forming the container by expanding the preform during a forming step, the forming step comprising at least an injection step, wherein a forming liquid is injected in the preform through the outlet of the injection device to expand the preform into the container, wherein the forming liquid of the forming step is the cleanable liquid, the method further comprising:

transferring the formed container containing the cleanable liquid to a concentrate filling station, the concentrate filling station being separate from the forming station, and filling the concentrated liquid in the container already containing the cleanable liquid, the filling the concentrated liquid being performed in the concentrate filling station.

By first forming and filling the containers in a forming station with a cleanable liquid, i.e. a liquid which can be easily removed from the machine and which will not encourage the development of micro-organisms, and by subsequently injecting of the concentrated liquid in a concentrate filling station being separate from the forming station, the cleaning of the forming station, having a complex structure, is greatly simplified even in case of bursting of a container. Furthermore, foaming of the liquid does not occur in the forming station, thereby reducing the risks of spilling the liquid in the forming station. Consequently, the need to clean the forming stations is reduced and the cleaning operations are less time consuming. The production rate of the machine can therefore be increased.

According to other features of the method according to the invention:
- the cleanable liquid is alcohol, still water, carbonated water or a detergent liquid;
- the concentrated liquid is a concentrated liquid containing sugar and/or an aroma;
- the concentrated liquid has a viscosity greater than the viscosity of water;
- the concentrated liquid further comprises a particulate material;
- the size of the particles of the particulate material is greater than 1 mm;
- the concentrated liquid is a syrup.
- the forming station is moved in rotation around a first axis during the forming step and the concentrate filling station is moved in rotation around a second axis, different from the first axis and substantially parallel to the first axis, during the step of filling the concentrated liquid;
- the concentrated liquid is a premix made of a mixing of a concentrate with a quantity of liquid, the premix having a volumetric concentrate concentration, and the end volume of end product filled in the container is the sum of a first volume of the cleanable liquid injected by the forming station and of a second volume of the premix filled in the same container by the concentrate filling station, the liquid forming the premix being preferably made of the same liquid material than the material of the cleanable liquid.

For example, when the concentrate is a sugar based material and the cleanable liquid is still or sparkling water, the unit for the concentrate concentration is in sugar grams per milliliters or the like.

According to another feature of the method according to the invention, the volumetric concentrate concentration is determined depending on the rotation speed of the forming station such that the first volume injected with cleanable liquid by the forming station leaves a free headspace at the top of the container which is large enough to prevent the cleanable liquid from overflowing out of the container during transferring the container from the forming station to the concentrate filling station, and/or the volumetric concentrate concentration is determined to optimize mixing of the first volume of cleanable liquid with the second volume of premix, and/or the volumetric concentrate concentration is determined to reduce the number of concentrate filling stations used by the method for a continuous production of successive container filled with the end product.

Advantageously, the free headspace left by the forming station can be obtained with an insert member being part of the injection device. The insert member can be a stretch rod stretching the preform during the forming step. The insert member is inserted into the formed and filled container before retrieving the injection device. Once the injection device is disconnected from the neck of the container, the top of the container is connected to the atmosphere. The insert member is then retrieved from the inside of the container and the level of liquid into the container goes down, leaving the free headspace.

The invention also relates to a machine for forming and filling a container from a preform comprising at least one forming station comprising an injection device, comprising an inlet in fluidic communication with a cleanable liquid source and an outlet through which the cleanable liquid source is intended to be injected, and a preform seat arranged to receive a preform, the forming station being arranged to place the preform received in the preform seat in fluidic communication with the outlet of the injection device, wherein the machine further comprises at least one concentrate filling station comprising an injection device comprising an inlet in fluidic communication with a concentrated liquid source and an outlet through which the concentrated liquid is intended to be injected, and a container seat arranged to receive a container already containing the cleanable liquid, the concentrate filling station being located downstream of the forming station.

The machine according to the invention is able to implement the method described above to produce formed and filled container at a high rate and can easily be cleaned.

According to other features of the machine according to the invention:
- the machine comprises placing means arranged for placing a preform in the forming station and transferring means arranged for transferring the formed container already containing cleanable liquid from the forming station to the concentrate filling station;
- the forming station is attached to a forming wheel moving in rotation around a first axis and the concentrate filling station is attached to a second wheel moving in rotation around a second axis, different from the first axis and substantially parallel to the first axis;
- the forming wheel carries a plurality of forming stations and the second wheel carries a plurality of concentrate filling stations such that the machine can simultaneously form and fill a plurality of preforms into containers and inject the concentrated liquid into a plurality of filled containers;
- the transferring means include a mechanism for reducing the pitch between two successive transferred containers while the two successive transferred containers move from the forming station to the concentrate filling station.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the terms "upper" and "lower" are defined relative to axis A, which corresponds to the axis of the container to be produced and which extends substantially vertically when the container is placed on its bottom. The terms "upstream" and "downstream" are defined relative to the direction in which the preforms and the containers circulate in the machine shown in FIG. 1.

The invention relates to the technical field of forming containers 1, such as bottles, for example sterile or asepticized bottles containing water or carbonated water based drinks or other type of liquids, such as cleaning products.

More specifically, the invention relates to a method for producing a container 1 from a preform 2 in a forming machine comprising at least a forming and filling station 4, a concentrate filling station 6 and means for carrying the preforms and the containers between the stations of the machine. For the rest of the description, the terms "forming and filling station 4" will be simplified in "forming station 4".

The machine is arranged to receive successive preforms 2, each made of a thermoplastic material. The thermoplastic material is for example chosen among the polyesters, such as polyethylene terephthalate (PET), polyethylene naphthalene (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), or other polymers, such as polyvinyl chloride (PVC) or a mix of these materials.

Figure 2:
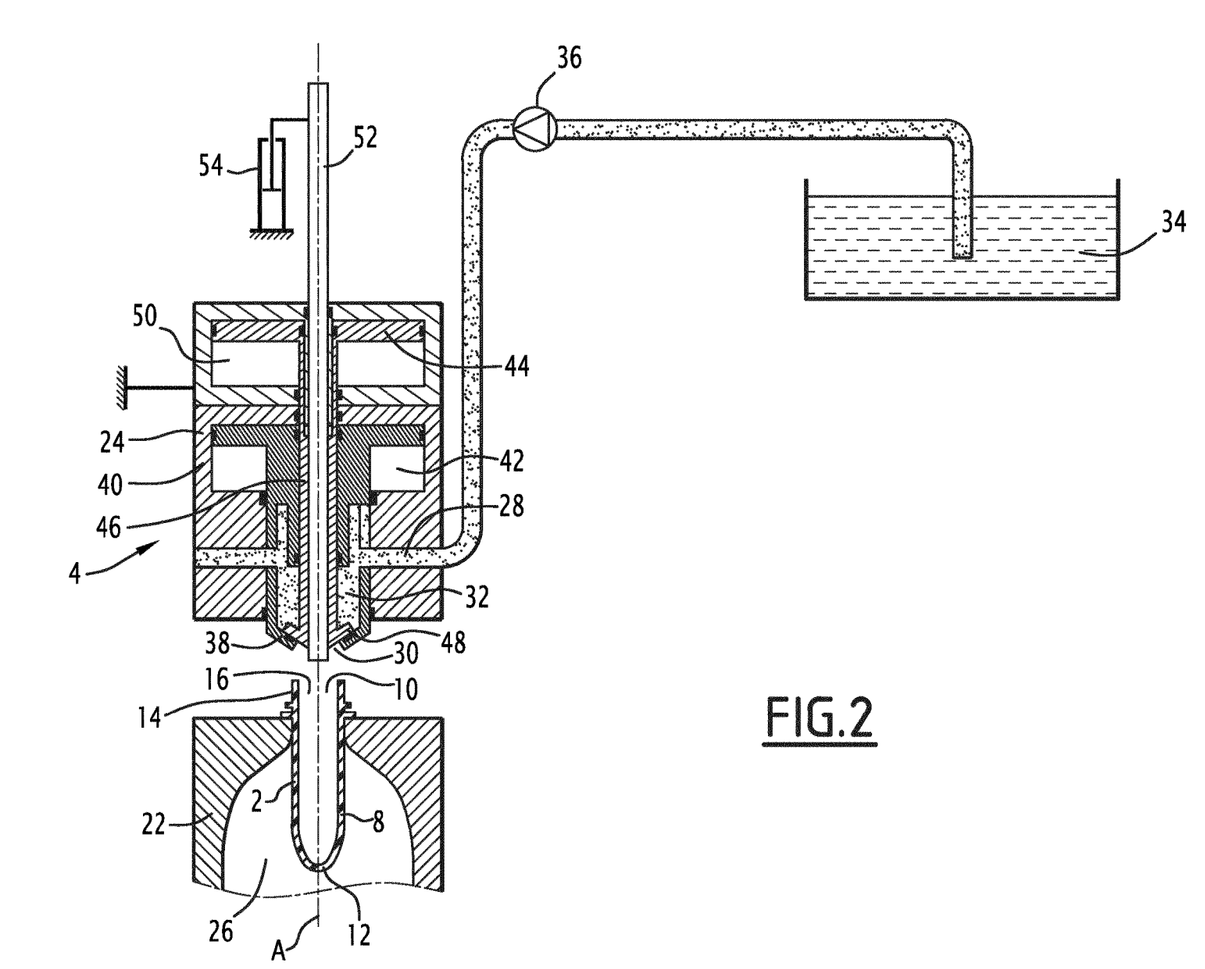
FIGS. 2, 3 and 4 are diagrammatical cross-section views of part of a forming station carrying a preform at various steps of the forming step of the method according to the invention.

Each preform 2 has for example the general shape of a test tube. Consequently, each preform 2 comprises a body 8 having the shape of a tube extending along a longitudinal axis A and having a U shape in longitudinal cross-section, i.e. in an axial plane containing the longitudinal axis A, as shown in FIG. 2. The preforms 2 have an open extreme part 10 and, at the other end, a closed extreme part 12. The open extreme part 10 has for example the final shape of the neck 14 of the container to be shaped, meaning that the shape of the neck 14 will not be modified during the container forming process. The neck 14 defines an inner opening 16 extending along the longitudinal axis A and delimited by a wall with an external face for example provided with a thread allowing the container 1 to receive a cap by screwing. The closed extreme part 12 has for example a hemispherical shape. The above described shape is given as a non-restricting example and other shapes can be foreseen, for example another shape of the neck 14, without a thread, comprising or not an outer shoulder extending radially substantially perpendicular to the longitudinal axis A.

The preforms 2 can be produced at another location than the location of the forming machine, such that the preforms are stored and shipped together to the location of the machine.

In the following description, the term "preform" is used for the preform in their initial shape as well as for the preform during their deformation into a container.

The preforms are then successively loaded in the machine and transferred to a heating station. The heating station is conventional and will not be described in detail herein. The heating station is arranged to heat each of the successive preforms at a temperature comprised between the glass transition temperature and the crystallization material of the thermoplastic material of the preform 2 such that the preforms 2 are placed in a malleable state in which they are able to be deformed under the influence of a pressure injected inside the heated preforms 2. Alternatively, the preforms 2 can be produced at the same location as the location of the forming machine such that the injected formed preforms are directly transferred to the inlet of the forming machine. This allows reducing the energy required for heating the preforms before the forming step.

Each heated preform 2 is then transferred, for example by means of a transfer wheel 18, to a forming station 4. The transfer wheel 18 includes placing means arranged to place a preforms in a forming station 4.

Figure 1:
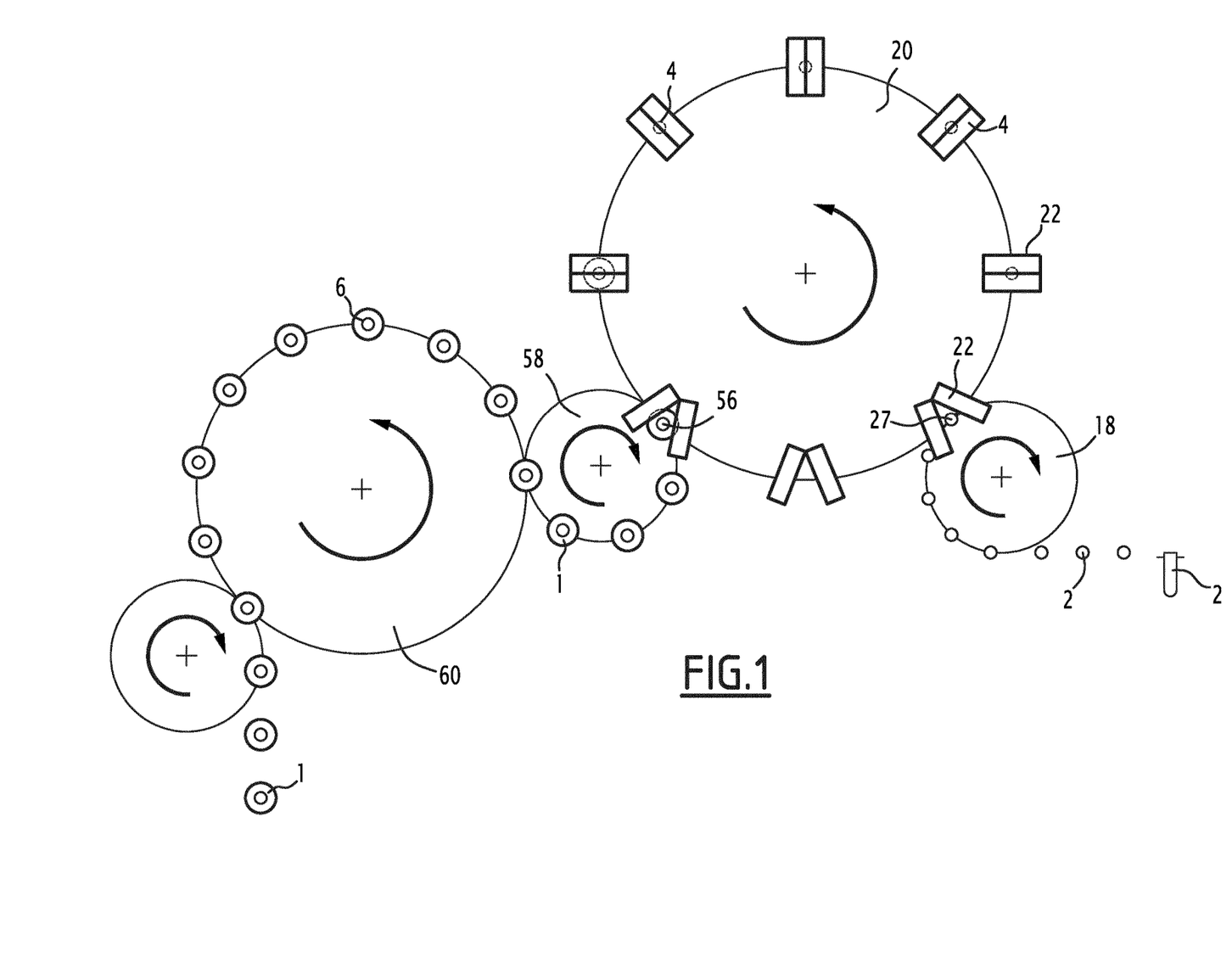
FIG. 1 is a diagrammatical view from above of a part of a machine for producing containers from preforms allowing carrying out the method according to the invention.

The forming station 4 is for example carried by a forming wheel 20 rotating around a first axis substantially parallel to the longitudinal axis A. The forming and filling step, which will be described subsequently, can then be carried out during the rotation of the forming station 4, which allows forming and filling several preforms 2 at the same time by providing several forming stations 4 on the wheel 20, as shown in FIG. 1.

Figure 3:
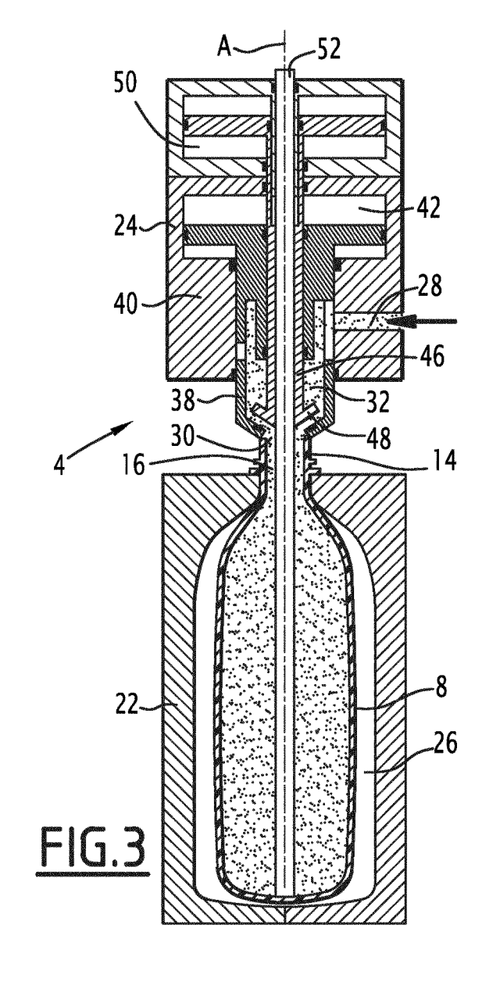
Figure 4:
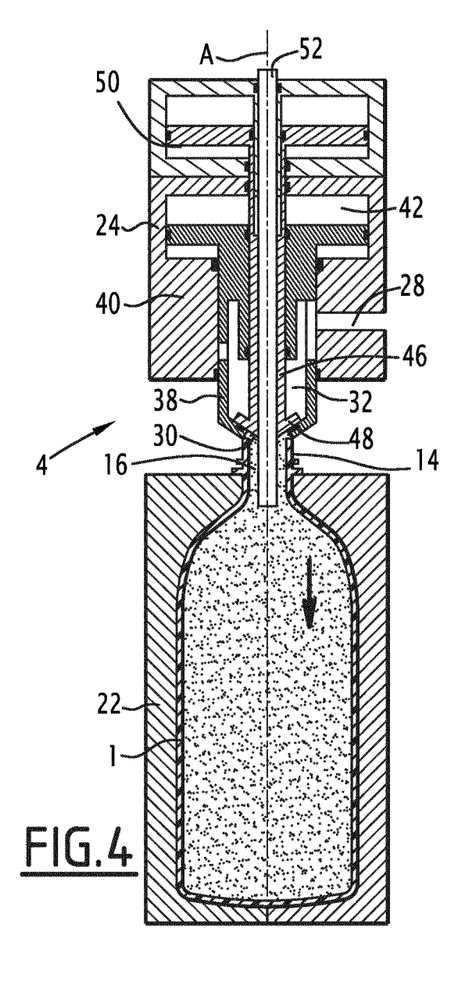

Each forming station 4 comprises a mold 22 arranged to receive a preform 2 and an injection device 24 arranged to inject a forming liquid in the preform 2 received by the mold 22, as shown in FIGS. 2 to 4. Such a forming station 4 is conventional for a hydroforming machine.

The mold 22 defines a molding cavity 26 having the shape of the container 1 to be produced. The mold 22 comprises for example at least two parts movable relative to each other, between an opened position and a closed position. The two parts are for example hinged together and are movable in rotation relative to each other around an axis substantially parallel to the axis A of the preform 2. Each part of the mold 22 comprises a body comprising a hollow recess having the shape of a half bottle to be formed. According to a non-limiting example, the hollow recess of one part comprises a semi-cylindrical portion, closed at its lower end by a bottom surface having the shape of a semi-circle, and terminated at its upper end by a tapered, then semi-cylindrical collar of a shape substantially complementary to the shape of half of the body 8 of the preform 2. The hollow recess of the other part of the mold is symmetrical to the hollow recess described above. In the opened position, the parts of the mold are separated from each other such that the preform 2 can be introduced between the two parts. In the closed position, the two parts are applied against each other to form a main part, such that the hollow recesses face each other and define together the molding cavity 26 having the shape of the container 1 to be formed. The mold 22 could comprise more than two parts. For example a third part having the shape of the bottom of the container could be provided to define the molding cavity 26 with two parts having the shape of the body of the container.

The transfer wheel 18 is arranged to move each preform 2 into a mold 22, which is in the opened position at an inlet 27 of the forming wheel. Once the preform is placed between the parts of the mold 22, the mold 22 is moved in the closed position and carries the preform in rotation with the forming wheel, the mold forming a preform seat. When the preform is placed in a mold 22, the molding cavity 26 is hermetically closed by the preform 2 and the neck 14 of the preform protrudes from the mold 22 such that its inner opening 16 remains accessible from outside the mold 22, as shown in FIG. 2.

The injection device 24 for injecting the pressurized incompressible liquid in the preform 2 will now be described. The injection device 24 described herein and shown in the figures is an example of an injection device that can be used for hydro forming methods and it is to be understood that the method according to the invention can be used with any other kind of injection devices.

The injection device 4 comprises an inlet 28, an outlet 30 and a chamber 32 extending between the inlet 28 and the outlet 30 and placing the inlet 28 in fluidic communication with the outlet 30.

The inlet 16 is placed in fluidic communication with an incompressible forming liquid source 34, for example a water reservoir, via injection means 36 adapted for transferring the liquid from the liquid source 34 to the inlet 28 at a controllable predetermined pressure, and appropriate tubing extending between the inlet 28, the injection means 36 and the liquid source 34. According to the embodiment shown in FIG. 2, the injection means 36 are formed by a pump. Alternatively, the injection means can also be formed by a conventional piston or by other appropriate means allowing controlling the pressure of the liquid injected in the preform. According to an embodiment, the pressure applied by the injection means is variable such that the liquid can be injected at different pressures in the preform 2.

The forming liquid source 34 is a source of a cleanable liquid. By cleanable liquid, it is meant a liquid which can easily be cleaned, i.e. which does not adhere to any part of the injection device 24 and which can be removed from the injection device simply by circulating cleaning products in the injection device. This means that the removal of the cleanable liquid does not require scrubbing or scraping any part of the injection device.

According to the invention, the cleanable liquid is for example still water, carbonated water, alcohol or a detergent liquid.

The outlet 30 is adapted to be placed in liquid tight fluidic communication with the opening 16 formed by the neck 14 of the preform 2 held by the mold 22 of the forming station 4, and therefore with the inner volume of the preform 2. By liquid tight fluidic communication, it is meant that when the outlet 30 is in fluidic communication with the inner volume of the preform 2, the liquid flows only in the inner volume of the preform 2 and not outside the preform 2.

The outlet 30 is for example formed by an opening of an injection nozzle 38. The outlet 30 is in fluidic communication with the chamber 32. The injection nozzle 38 is movable inside a housing 40 of the injection device 24, in translation along axis A between a retracted position (FIG. 2) and an active position (FIGS. 3 and 4). In the retracted position, the injection nozzle 38 leaves room under the injection device 24 to position a preform 2 in the mold 22 or to retrieve a formed container 1 from the mold 22. In the active position, the injection nozzle 38 is placed against the neck 14 of the preform 2 with a liquid tight contact between the injection nozzle 38 and the neck 14 of the preform 2, such that the outlet 30 of the injection nozzle 38 is in fluidic communication with the inner volume of the preform 2. The chamber 32 of the injection nozzle 38 for example comprises a hollow space including a regular cylindrical portion and a truncated cone or a pyramidal portion extending between the regular cylindrical portion and the outlet 30 of the injection nozzle. The diameter of the chamber 32 reduces progressively from the diameter of the regular cylindrical portion to the diameter of the opening in the conical portion. The housing 40 further comprises a first upper compartment 42 arranged to receive actuation means 44 for moving the injection nozzle 38. The actuation means are for example pneumatic actuation means and for example comprise a piston, attached to the injection nozzle 38 and hermetically separating the first upper compartment 42 into an upper part and into a lower part, each able to be filled with air. For moving the injection nozzle 38 between its retracted position and its active position, air is injected in the upper part of the first upper compartment 42 in order to increase the pressure in the upper part and to move the piston such that the volume of the upper part increases, while to volume of the lower part decreases. Conversely, for moving the injection nozzle 38 between its active position and its retracted position, air is injected in the lower part of the first upper compartment 42 in order to increase the pressure in the lower part and to move the piston such that the volume of the lower part increases, while to volume of the upper part decreases. The inner volume of the chamber 32 is hermetically isolated from the first upper compartment 42 by appropriate sealing means.

The injection device 24 further comprises a hollow control rod 46 extending in the chamber 34 along axis A. The hollow control rod 46 comprises at its lower end, extending in the chamber 32, a sealing ring 48. The sealing ring 48 has a shape which is complementary to the shape of part of the conical portion of the injection nozzle 38, such that, when the sealing ring 48 is applied against the wall of the conical portion, the sealing ring 48 closes hermetically the chamber 32 and prevents liquid from flowing through the outlet 30. The hollow control rod 46 is movable in translation along axis A in the chamber 34 between an injecting position, shown in FIG. 3, wherein the sealing ring 48 is spaced from the wall of the conical portion of the injection nozzle and wherein the outlet 30 is in fluidic communication with the inlet 28 via the chamber 32, and a sealing position, shown in FIGS. 2 and 4, wherein the sealing ring 48 is applied against the wall of the conical portion of the injection nozzle 34 and hermetically closes the chamber 32.

The housing 40 further comprises a second upper compartment 50 arranged to receive actuation means for moving the control rod 46. The actuation means are for example pneumatic actuation means and for example comprise a piston, attached to the control rod 46 and hermetically separating the second upper compartment 50 into an upper part and into a lower part, each able to be filled with air. For moving the control rod 46 between its injecting position and its sealing position, air is injected in the upper part of the second upper compartment 50 in order to increase the pressure in the upper part and to move the piston such that the volume of the upper part increases, while to volume of the lower part decreases. Conversely, for moving the control rod 46 between its sealing position and its injecting position, air is injected in the lower part of the second upper compartment 50 in order to increase the pressure in the lower part and to move the piston such that the volume of the lower part increases, while to volume of the upper part decreases. The first upper compartment 42 is hermetically isolated from the second upper compartment 50 by appropriate sealing means.

According to the embodiment shown in the FIGS. 2 to 4, a stretch rod 52 extends inside the hollow control rod 46, passes through the outlet 30 and extends in the preform 2 to assist in the axial deformation of the preform 2 into a container, as known per se. The stretch rod 52 is movable in translation along axis A in the hollow control rod 46 and is actuated by appropriate actuation means 54, for example a servo motor or a magnetic actuation means. The functioning of the stretch rod is known and will not be described in detail herein. Advantageously, the stretch rod 52 can be used to determine a volume of a free headspace to be left in the container. The free headspace is the volume of the container that is not filled with the cleanable liquid at the end of the forming step. As known per se, the end of the stretch rod 52 can be left in the container during the forming step and while the injection nozzle 38 is moved to the retracted position, thereby placing the top of the container is fluidic communication with the atmosphere. The end of the stretch rod 52 is then retrieved from inside the container and the level of liquid into the container goes down, leaving the free headspace. The volume of the free headspace can be set by choosing the volume of the stretch rod 52 left in the container at the end of the forming step.

For forming and filling a container 1 from a preform 2 placed in a mold 22 in the closed position, the injection nozzle 38 is moved in the active position and the control rod 46 is moved to the injecting position. The cleanable liquid from the liquid source 34 then flows through the outlet 30 in the inner volume of the preform 2 at a predetermined pressure, for example around 5 bars. This pressure of the cleanable liquid causes the preform 2, in a malleable state, to expand towards the wall of the molding cavity 26, as shown in FIG. 3. As known, this expansion can be assisted in the axial direction by the stretch rod 52. In order to completely urge the wall of the preform against the wall of the molding cavity 26, a pressure peak can be applied to the liquid inside the container such that the pressure inside the preform increases up to for example around 40 bar. Such a pressure peak guarantees a good imprint of the shape of the molding cavity 26 on the container, in particular when ridges or embossed letters or logos must be reproduced on the external surface of the container wall.

Once the container is completely shaped and filled with the cleanable liquid at the end of this forming step, the control rod 46 moves back to its closed position, as shown in FIG. 4, and the injection nozzle 38 is moved back to its retracted position and the free headspace is formed as mentioned previously. The mold is opened and the formed and filled container is retrieved from the mold at an outlet 56 of the forming wheel 20, for example by a second transfer wheel 58, as shown in FIG. 1. The forming station 4 then moves to the inlet 27 of the forming wheel 20 to receive a new preform 2 and produce a new container.

As mentioned previously, successive containers 1 can be produced continuously and simultaneously by providing several forming and filling stations 4 distributed on the periphery of the forming wheel 20.

It should be noted that if a container 1 bursts in a forming station 4 or if liquid is spilled out of a container in a forming station 4, only a cleanable liquid will soil the complex mechanical structure of the forming wheel 20 and of its forming and filling stations 4 since the forming liquid is a cleanable liquid. Consequently, stopping the forming wheel 20 and accessing the soiled parts of this complex structure for removing adhering parts of the liquid is not required as it is the case when the forming liquid is not a cleanable liquid. The container filled with the cleanable liquid is transferred, by the second transfer wheel 58, to a concentrate filling station 6, which is separate from the forming and filling stations 4 and located downstream of the forming and filling stations 4. By separate, it is meant that the concentrate filling station 6 is sufficiently spaced from the forming and filling stations 4 and from the forming wheel 20 for preventing the liquid injected by the concentrate filling station 6, which is not a cleanable liquid as will be described subsequently, from reaching the forming wheel 20 in case of a leak or of a projection of the liquid. The second transfer wheel 58 can be arranged to reduce the pitch between two successive transferred containers while the two successive transferred containers move from the forming station to the concentrate filling station.

The concentrate filling station 6 is for example carried by a second wheel 60, distinct from the forming wheel 20, rotating around a second axis substantially parallel to the longitudinal axis A and to the first axis and distinct from the first axis. The concentrate injecting step, which will be described subsequently, can then be carried out during the rotation of the second wheel 60, which allows performing the concentrate injecting step on several containers 1 at the same time by providing several concentrate filling stations 6 on the second wheel 60, as shown in FIG. 1. Since the concentrate filling stations 6 require less space than the forming stations 4, the concentrate filling stations 6 can be placed on the second wheel 60 with less space between successive filling stations 6. In this case, the pitch between successive containers has to be reduced while the successive transferred containers move from the forming station to the concentrate filling station. Such an embodiment reduces the space requirement and/or improves the throughput of the machine.

Figure 5:
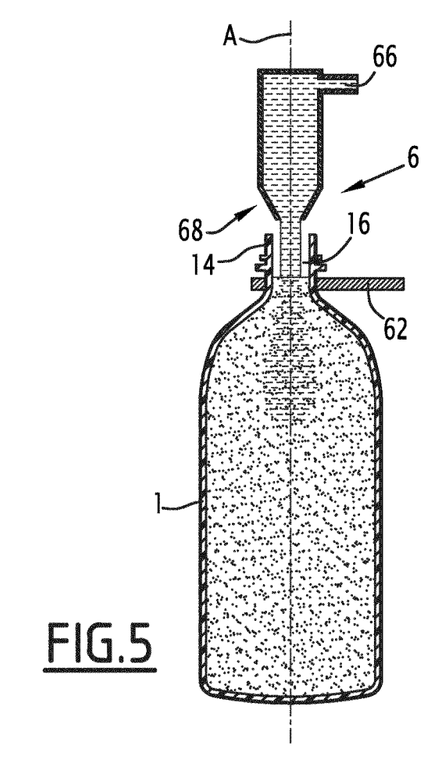
FIG. 5 is a diagrammatical cross-section view of part of a concentrate filling station during the step of filling the concentrated liquid.

Each concentrate filling station 6 comprises a container seat 62 for receiving a container 1 and a concentrate nozzle 68 for injecting a concentrated liquid in the container 1 received by the container seat 62, as shown in FIG. 5.

The container seat 62 is for example arranged to hold a container 1 by its neck 14 and to maintain it under the concentrate nozzle 68.

The concentrate nozzle 68 is a conventional nozzle 68, for example similar to the filling nozzles used in conventional filling machines, arranged to supply a predetermined amount of a concentrated liquid from a concentrated liquid source during a step of filling concentrated liquid. The concentrate nozzle 68 comprises an inlet 66 in fluidic communication with the concentrated liquid source (not shown) and an outlet through which the concentrated liquid is filled in the container. Advantageously, the concentrate nozzle 68 ends at a distance above the finish of the neck 14. The concentrated liquid is filled in the container at the atmospheric pressure. There is no contact between the concentrate nozzle 68 and the container 1. This avoids cross contamination between successive filled containers. Such a nozzle and step of filling concentrated liquid are known per se and will not be described in detail herein.

The concentrated liquid is formed by any liquid which can be mixed with the cleanable liquid in the container to form an end product filling the container. More particularly, the concentrated liquid is not a cleanable liquid as defined previously. The concentrated liquid has for example viscosity greater than and different from the viscosity of water. Such a concentrated liquid is for example a concentrated liquid sugar and/or an aroma arranged to form with the cleanable liquid a non-carbonated or a carbonated soft drink, when the cleanable liquid is still water or carbonated water, or an aromatic cleaning product or medical product, when the cleanable liquid is a detergent liquid or alcohol. For producing a beverage, the concentrated liquid is for example a syrup. The concentrated liquid can also contain a particulate material, such as fruit pulp or fruit parts. The size of the particles of the particulate material is for example greater than 1 mm, meaning that the largest dimension of each particle of the material is on average greater than 1 mm. Such a particulate material is for example present when the end product is a fruit juice containing pulp.

According to an embodiment, the concentrated liquid is a premix made of a mixing of a concentrate with a quantity of liquid, the premix having a volumetric concentrate concentration. The liquid of the premix is for example the same as the cleanable liquid.

The volume of cleanable liquid injected in the preform 2 and the volume of the free headspace are arranged such that the concentrated liquid can be injected in the filled container 1 without overflowing from the container 1. The volume of concentrate material injected in the container 1 containing the cleanable liquid is arranged to fill at least a part of the volume of the free headspace such that the desired volume of the end product in the container 1 is reached.

According to the embodiment wherein the concentrated liquid is a premix, the end volume of the end product filled in the container 1 is the sum of a first volume of the cleanable liquid injected by the forming station 4 and of a second volume of the premix filled in the same container 1 by the concentrate filling station 6.

The volumetric concentrate concentration of the premix is determined depending on the rotation speed of the forming station 4 such that the first volume injected with cleanable liquid by the forming station 4 leaves a free headspace at the top of the container 1 which is large enough to prevent the cleanable liquid from overflowing out of the container 1 during transferring the container 1 from the forming station to the concentrate filling station. Alternatively or additionally, the volumetric concentrate concentration of the premix can be determined to optimize mixing of the first volume of cleanable liquid with the second volume of premix. Alternatively or additionally, the volumetric concentrate concentration of the premix is determined to reduce the number of concentrate filling stations 6 used by the method for a continuous production of successive containers 1 filled with the end product.

Even if the injection of the concentrated liquid causes a spilling of the end product, for example by creating a foam in the container 1, it is ensured that the concentrated liquid will not soil the complex mechanical structure of the forming wheel 20 and of its forming and filling stations 4. The spilling of the end product can possibly cause a soiling of the container seats of the concentrate filling stations 6, but these parts are easily accessible and can easily be cleaned.

Consequently, the machine described above allows safely producing filled containers at a high rate without risking a contamination of the forming and filling stations even when the forming liquid is injected at a high pressure.

The invention claimed is:

1. A method for forming a container from a preform and filling the container with an end product, the end product being obtained by mixing a cleanable liquid with a concentrated liquid, the method comprising the steps of:
    placing the preform in a forming station comprising an injection device such that the preform is placed in fluidic communication with an outlet of the injection device,
    fully forming the container by injecting a first volume of a forming liquid into the preform through the outlet of the injection device to expand the preform into a formed container, the forming liquid being the cleanable liquid and the first volume being less than a full volume of the container,
    transferring the formed container containing the cleanable liquid to a concentrate filling station, the concentrate filling station being separate from the forming station, and
    producing the full volume of the end product by providing a second volume of the concentrated liquid into the container already containing the first volume of the cleanable liquid, the providing of the concentrated liquid being performed in the concentrate filling station,
    the forming station being moved in rotation around a first axis during the forming step and the concentrate filling station being moved in rotation around a second axis, different from the first axis and substantially parallel to the first axis, during the step of filling the concentrated liquid,
    determining and varying a volumetric concentrate concentration of the concentrated liquid based on a rotation speed of the forming station at which the first volume of the cleanable liquid leaves a free headspace at the top of the container which is large enough to prevent the cleanable liquid from overflowing out of the container during transferring the container from the forming station to the concentrate filling station.

2. The method according to claim 1, wherein the cleanable liquid is one of alcohol, still water, carbonated water or a detergent liquid.

3. The method according to claim 1, wherein the concentrated liquid is a concentrated liquid containing one of sugar and an aroma.

4. The method according to claim 3, wherein the concentrated liquid has a viscosity greater than the viscosity of water.

5. The method according to claim 3, wherein the concentrated liquid further comprises a particulate material.

6. The method according to claim 5, wherein the particulate material has particles of a size greater than 1 mm.

7. The method according to claim 3, wherein the concentrated liquid is a syrup.

8. The method according to claim 1, wherein the concentrated liquid is a premix made of a mixing of a concentrate with a quantity of liquid, the premix having a volumetric concentrate concentration,
    and wherein an end volume of end product filled in the container is a sum of a first volume of the cleanable liquid injected by the forming station and of a second volume of the premix filled in a same container by the concentrate filling station, the liquid forming the premix being preferably made of the same liquid material than the material of the cleanable liquid.

9. The method according to claim 1, wherein
    the volumetric concentrate concentration is determined to optimize mixing of the first volume of cleanable liquid with a second volume of premix.

10. A machine for forming and filling a container from a preform comprising:
    at least one forming station, the forming station including
        an injection device having an inlet in fluidic communication with a cleanable liquid source and an outlet through which a first volume of the cleanable liquid source is to be injected, the first volume being less than the full volume of the container, and
        a preform seat arranged to receive the preform, the forming station configured to place the preform received in the preform seat in fluidic communication with the outlet of the injection device,
    at least one concentrate filling station, the concentrate filling station including
        an injection device having an inlet in fluidic communication with a concentrated liquid source and an outlet through which the volumetric concentrate concentration of the concentrated liquid is to be injected in a second volume, and
        a container seat arranged to receive a container already containing the cleanable liquid, the concentrate filling station being located downstream of the forming station,
    a first transfer station configured to place a preform in the forming station and a second transfer station configured to transfer the formed container already containing cleanable liquid from the forming station to the concentrate filling station, the forming station being moveable in rotation around a first axis during forming of the container and the concentrate filling station being moveable in rotation around a second axis during injecting of the concentrated liquid, the second axis being different from the first axis and substantially parallel to the first axis, the first and second volumes cooperating to form the full volume of the container, wherein a volumetric concentrate concentration of the concentrate is determined and varied depending on a rotation speed of the forming station wherein the first volume of the cleanable liquid provides a free headspace at a top of the container preventing the cleanable liquid from overflowing out of the container during transferring of the container from the forming station to the concentrate filling station.

11. The machine according to claim 10, wherein the forming station is attached to a forming wheel moving in rotation around the first axis and the concentrate filling station is attached to a second wheel moving in rotation around the second axis.

12. The machine according to claim 10, wherein the forming wheel carries a plurality of forming stations and wherein the second wheel carries a plurality of concentrate filling stations such that the machine is configured to simultaneously form and fill a plurality of preforms into containers and inject the concentrated liquid into a plurality of filled containers.

13. The machine according to claim 10, wherein the second transfer station is configured to reduce pitch between two successive transferred containers while the two successive transferred containers move from the forming station to the concentrate filling station.

14. The method according to claim 1, wherein the volumetric concentrate concentration is determined to reduce the number of concentrate filling stations used by the method for a continuous production of successive container filled with the end product.

15. The method according to claim 1, wherein the concentrated liquid is not a cleanable liquid.

16. The machine according to claim 10, wherein the concentrated liquid is not a cleanable liquid.

17. A method for forming a container from a preform and filling the container with an end product, the end product being obtained by mixing a cleanable liquid with a concentrated liquid, the method comprising the steps of:

placing the preform in a forming station including an injection device such that the preform is placed in fluidic communication with an outlet of the injection device;

injecting a first volume of a forming liquid into the preform to fully expand the preform into a formed container of a final volume, the forming liquid being a cleanable liquid and the first volume being less than the final volume;

transferring the formed container containing the cleanable liquid to a concentrate filling station, the concentrate filling station being separate from the forming station;

in the concentrate filling station, providing a concentrated liquid into the container already containing the cleanable liquid, the concentrated liquid not being a cleanable liquid and being of a second volume, the second volume cooperating with the first volume to constitute a final volume of the container; and the forming station being moved in rotation around a first axis during the injecting step and the concentrate filling station being moved in rotation around a second axis during the filling step, the second axis being different from the first axis and substantially parallel to the first axis;

wherein the first volume is determined and varied on a basis of a rotation speed of the forming station such that the first volume leaves a free headspace at the top of the formed container that is large enough to prevent the cleanable liquid from overflowing out of the formed container during transferring of the formed container from the forming station to the concentrate filling station, and a volumetric concentrate concentration of the second volume of the concentrate is determined based on the first volume.

* * * * *